UNITED STATES PATENT OFFICE.

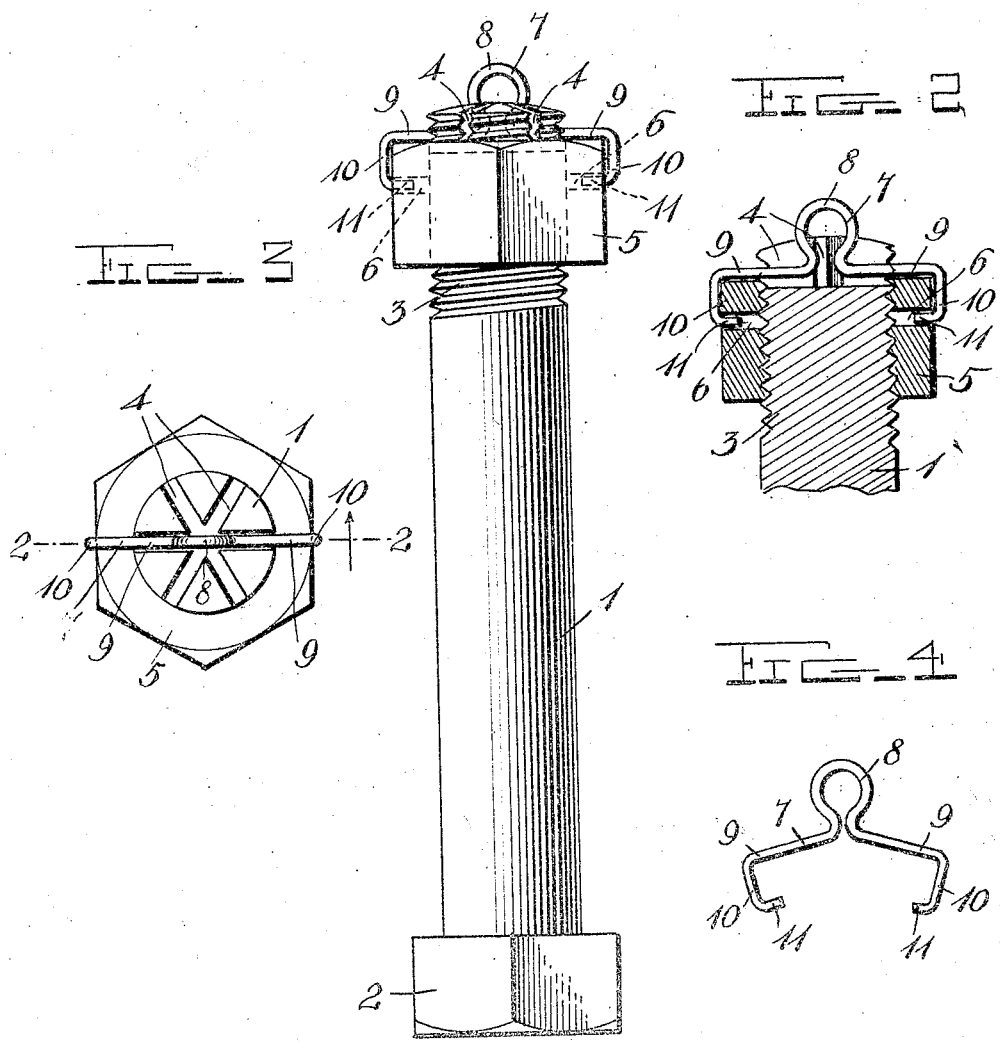

PAUL C. SCHMIDT, OF HARTFORD, CONNECTICUT.

NUT-LOCK.

No. 874,544.

Specification of Letters Patent.

Patented Dec. 24, 1907.

Application filed July 25, 1907. Serial No. 385,537.

*To all whom it may concern:*

Be it known that I, PAUL C. SCHMIDT, a citizen of the United States, residing at Hartford, in the county of Hartford and State of Connecticut, have invented certain new and useful Improvements in Nut-Locks; and I do declare the following to be a full, clear, and exact description of the invention, such as will enable others skilled in the art to which it appertains to make and use the same.

This invention relates to nut locks, and has for its objects to provide a simple and inexpensive device of this character which may be readily applied for use, one by means of which the nut will be securely fixed against accidental rotation on the bolt, and one which permits of the nut being quickly released for removal at will.

With these and other objects in view, the invention comprises the novel features of construction, and combination of parts more fully hereinafter described.

In the accompanying drawings,—Figure 1 is a side elevation of a bolt having a nut applied thereto and locked in accordance with the invention; Fig. 2 is a view partly in section of the forward end of the bolt and nut taken on the line 2—2 of Fig. 3; Fig. 3 is an end elevation of the device; Fig. 4 is a detail view of the nut-locking member or bail.

Referring to the drawings, 1 designates a bolt provided with a head 2 and with a threaded portion 3, said bolt having at its forward end a plurality of intersecting transverse slots 4, there being removably threaded on the bolt a nut 5 provided with a pair of diametrically opposed transverse openings or sockets 6, for a purpose which will presently appear.

Employed in connection with the bolt and for locking the nut against movement thereon is a locking member or bail 7, composed of a length of spring wire bent to provide a central outwardly folded loop or eye 8, and a pair of oppositely extending alined arms 9, provided at their outer ends with right-angularly disposed portions 10, having terminal inturned engaging fingers 11, it being noted on reference to Fig. 4 that when the bail is removed from the bolt the arms 9 stand at a slight inclination relatively with the loop or eye 8 contracted.

In practice after the nut 5 has been applied to the bolt, and properly set up, the locking member or bail is seated in one of the transverse grooves 4 at the end of the bolt with the fingers 11 at the ends of the portions 10 seated respectively in the sockets 6, thereby securely holding the nut against rotation, it being understood, of course, that the nut may be released when circumstances require by disengaging the fingers 11 from the sockets to free the locking member from engagement with the nut and bolt.

It will be noted that when the locking member is applied the spring loop 8 will be expanded, and will thus exert a tension for holding the fingers in secure engagement with the sockets in the nut.

I claim as my invention:—

In a nut lock, a bolt provided at its forward end with a transverse groove or channel, a nut threaded onto the bolt and having a pair of opposed radial sockets, a spring metal locking bail designed to seat in said channel and having a pair of oppositely extended elongated arms provided with right angularly extended portions having terminal inturned fingers to seat respectively in said sockets, said locking member being provided with an outwardly folded spring loop connecting said arms and adapted to contract and hold the arms under tension when the locking member is applied.

In testimony whereof I have hereunto set my hand in presence of two subscribing witnesses.

PAUL C. SCHMIDT.

Witnesses:
T. F. BUTLER,
PETER SCOTT.